(12) United States Patent
Lindholm et al.

(10) Patent No.: US 10,414,268 B2
(45) Date of Patent: Sep. 17, 2019

(54) GAS TANK ARRANGEMENT FOR A DUAL FUEL INTERNAL COMBUSTION ENGINE

(71) Applicant: VOLVO TRUCK CORPORATION, Göteborg (SE)

(72) Inventors: Lennart Lindholm, Västra Frölunda (SE); Peter Gollungberg, Kyrkesund (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/763,906

(22) PCT Filed: Oct. 2, 2015

(86) PCT No.: PCT/EP2015/072850
§ 371 (c)(1),
(2) Date: Mar. 28, 2018

(87) PCT Pub. No.: WO2017/054888
PCT Pub. Date: Apr. 6, 2017

(65) Prior Publication Data
US 2018/0264935 A1    Sep. 20, 2018

(51) Int. Cl.
*B60K 15/03* (2006.01)
*F02M 21/02* (2006.01)
(Continued)

(52) U.S. Cl.
CPC ........ *B60K 15/03006* (2013.01); *F02D 19/06* (2013.01); *F02M 21/0203* (2013.01);
(Continued)

(58) Field of Classification Search
CPC .... B60K 15/03006; B60K 2015/03118; B60K 2015/03144; B60K 2015/03157;
(Continued)

(56) References Cited

U.S. PATENT DOCUMENTS

2003/0221433 A1* 12/2003 Gustafson ................ F17C 5/06
62/48.1
2012/0216919 A1   8/2012 Nylund
(Continued)

FOREIGN PATENT DOCUMENTS

| JP | 2002327658 A | 11/2002 |
|---|---|---|
| WO | 0148367 A1 | 7/2001 |
| WO | 2009110792 A1 | 9/2009 |

OTHER PUBLICATIONS

International Search Report (dated Dec. 1, 2016) for corresponding International App. PCT/EP2015/072850.

*Primary Examiner* — Jacob M Amick
(74) *Attorney, Agent, or Firm* — WRB-IP LLP

(57) ABSTRACT

A gas tank arrangement for a dual fuel internal combustion engine includes gas tank for containing a combustible gas, wherein the gas tank arrangement further includes an additional gas tank downstream the gas tank, wherein the additional gas tank is configured to be arranged in upstream fluid communication with an air inlet of the dual fuel internal combustion engine for delivery of combustible gas to the dual fuel internal combustion engine via the air inlet.

15 Claims, 2 Drawing Sheets

(51) Int. Cl.
  *F02M 37/00* (2006.01)
  *F02D 19/06* (2006.01)
  *F17C 7/04* (2006.01)

(52) U.S. Cl.
  CPC .... *F02M 21/0215* (2013.01); *F02M 37/0064* (2013.01); *F17C 7/04* (2013.01); *F17C 2201/056* (2013.01); *F17C 2205/0326* (2013.01); *F17C 2205/0338* (2013.01); *F17C 2221/033* (2013.01); *F17C 2223/0123* (2013.01); *F17C 2223/0161* (2013.01); *F17C 2223/033* (2013.01); *F17C 2223/035* (2013.01); *F17C 2225/0123* (2013.01); *F17C 2225/036* (2013.01); *F17C 2227/0135* (2013.01); *F17C 2227/0157* (2013.01); *F17C 2227/0302* (2013.01); *F17C 2227/0393* (2013.01); *F17C 2250/01* (2013.01); *F17C 2250/032* (2013.01); *F17C 2250/061* (2013.01); *F17C 2250/0631* (2013.01); *F17C 2265/066* (2013.01); *F17C 2270/0171* (2013.01); *Y02T 10/32* (2013.01); *Y02T 10/36* (2013.01)

(58) Field of Classification Search
  CPC .. F17C 7/04; F02M 37/0064; F02M 37/0088; F02M 21/0203; F02D 19/06; F02D 19/0602; F02D 19/0642; F02D 19/0663; F02D 19/0665
  See application file for complete search history.

(56) References Cited

U.S. PATENT DOCUMENTS

| | | | |
|---|---|---|---|
| 2013/0269633 A1* | 10/2013 | Bui | B63H 21/12 123/3 |
| 2014/0096539 A1* | 4/2014 | Gustafson | F02M 21/0221 62/49.1 |

\* cited by examiner

GAS TANK ARRANGEMENT FOR A DUAL FUEL INTERNAL COMBUSTION ENGINE

BACKGROUND AND SUMMARY

The present invention relates to a gas tank arrangement for a dual fuel internal combustion engine for a vehicle. The invention also relates to a vehicle comprising such a gas tank arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines, cars, etc.

In relation to propulsion systems for heavy duty vehicles, internal combustion engines are frequently used. These internal combustion engines are most often propelled by a combustible fuel such as e.g. diesel or petrol. However, in order to further reduce engine emissions of the vehicles, alternative propulsion methods and/or fuels are being used, either alone or in combination with the well known combustible feels. These may include, for example, ethanol or electrical propulsion from an electric machine, etc.

As a further alternative, a combustible gas, such as e.g. compressed natural gas, DME, biogas, etc. has been found a suitable propulsion fuel for vehicles in the form of trucks. The combustible gas can be used in combination with the combustible fuel for propelling the internal combustion engine, in the following referred to as a dual fuel internal combustion engine. Since the residuals from the combustible gas are relatively environmentally friendly in comparison to e.g. combustible fuels, pollution from the emissions thereof are reduced for these types of engines.

A problem with engines being propelled by the above described combustible gas is that if leakage of gas occurs from e.g. the gas tank or other positions of the system prior to combustion thereof, there is a risk of green house gas emission pollution. Unwanted leakage of this kind also has an economical aspect since the fuel consumption will increase. There is thus a need to further improve the gas tank arrangements for dual fuel internal combustion engines.

It is desirable to provide a gas tank arrangement which at least partially overcomes the deficiencies of the prior art.

According to a first aspect of the present invention, there is provided a gas tank arrangement for a dual fuel internal combustion engine, the gas-tank arrangement comprising a gas tank for containing a combustible gas, wherein the gas tank arrangement further comprises an additional gas tank downstream said gas tank, wherein the additional gas tank is configured to be arranged in upstream fluid communication with an air inlet of the dual fuel internal combustion engine for delivery of combustible gas to the dual fuel internal combustion engine via said air inlet.

The wording "combustible gas" should in the following and throughout the entire description be interpreted as a gas which can be ignited, either self-ignited by compression or be ignited by e.g. a spark plug. The invention should thus not be limited to any specific combustible gas. However, as a non-limiting example, the combustible gas may be natural gas, which is described farther below. Other alternatives are of course conceivable such as e.g. DME or biogas, etc. The combustible gas which can be provided in the gas tank can be in liquid phase and in gas phase. Hence, the wording "combustible gas" should be interpreted to include liquefied gas as well as gas in gas phase. Accordingly, a lower portion of the gas tank can be provided with liquid combustible gas while an upper portion of the gas tank can be provided with combustible gas in gas phase.

Furthermore, the air inlet of the dual fuel internal combustion engine should be understood to mean the inlet where air is provided to the inlet manifold of the combustion engine. It should also be understood to mean the inlet manifold itself. Hence, the combustible gas can be delivered to the dual fuel internal combustion engine from the additional gas tank as a mixture with air at the inlet manifold.

As described above, the combustible gas may be in a liquid phase and in a gas phase. The wording "fluid communication" should therefore in the following and throughout the entire description be interpreted as a fluid communication for both liquids and gases.

An advantage of the present invention is that the fuel consumption for the dual fuel internal combustion engine is improved. The reason is that prior to refill of the gas tank, the pressure level of the gas tank can be reduced by delivery of combustible gas to the additional gas tank instead of venting the gas tank and deliver excess gas to e.g. the tank station or to the ambient environment, as has been done in prior art solutions. Accordingly, excess gas can be taken cared of by the additional gas tank when venting the gas tank. The gas tank arrangement is thus more environmentally friendly since excess gas from the gas tank can be stored in the additional gas tank instead of ventilation to the ambient environment.

Furthermore, by arranging the additional gas tank in fluid communication with the air inlet of the dual fuel internal combustion engine, the pressure level demands on the additional gas tank can be reduced. When delivering combustible gas to the dual fuel internal combustion engine via the air inlet, the pressure demands are lower compared to delivery of combustible gas to the fuel injectors of the dual fuel internal combustion engine for the propulsion function thereof.

According to an example embodiment, the gas tank arrangement may comprise a compressor arranged in fluid communication between the gas tank and the additional gas tank.

Hereby, the combustible gas delivered from the gas tank to the additional gas tank can be pressurized to a predetermined limit. An advantage of pressurizing the combustible gas is that more gas can be stored/contained in the additional gas tank. Also, it may be necessary to overcome the pressure generated by the turbine compressor of the dual fuel internal combustion engine. Furthermore, the compressor can be controlled by a control unit for controllably delivery of combustible gas to the additional gas tank. For example, the compressor may be controlled to deliver combustible gas to the additional gas tank during predetermined conditions. Such predetermined conditions may, for example, be that the additional gas tank has sufficient space to receive further combustible gas, or that the pressure in the gas tank is too high and the gas tank is in need of ventilation, etc.

According to an example embodiment, the gas tank arrangement may comprise a control valve positioned downstream the additional gas tank.

Hereby, the dual fuel internal combustion engine can controllably be provided with combustible gas from the additional gas tank. Thus, the dual fuel internal combustion engine can receive combustible gas from the additional gas tank when the conditions for doing so are beneficial. The control valve may, for example, be controlled by the above described control unit. Accordingly, the control valve is thus configured to be positioned in fluid communication between the addition gas tank and the air inlet of the dual fuel internal combustion engine. The conditions beneficial for receiving combustible gas from the additional gas tank to the air inlet of the dual fuel internal combustion engine may comprise e.g. sufficient engine temperature and sufficient operation of an engine after treatment system, etc.

According to an example embodiment, the gas tank arrangement may comprise a gas conduit in fluid communication with the gas tank and configured to be arranged in fluid communication with the fuel injection system of the dual fuel internal combustion engine for supply of combustible gas front the gas tank.

Hereby, the dual fuel internal combustion engine can be propelled by combustible gas also via the fuel injection system.

According to an example embodiment, the gas conduit may comprise means for converting liquefied combustible gas to compressed combustible gas.

Hereby, the combustible gas can be provided in liquid phase from the gas tank and thereafter converted into pressurized gas phase which is suitable for delivery to the fuel injection system. The gas conduit can thus be provided in connection to the lower portion of the gas tank.

According to an example embodiment, the means for converting liquefied combustible gas to compressed combustible gas may comprise a fuel pump and an evaporating unit in downstream fluid communication with said fuel pump.

The wording evaporating unit should be understood to mean a device or arrangement which converts a fluid from a liquid phase to a gas phase. Such evaporating unit may, as a non-limiting example, be a heat exchanger.

The fuel pump thus pressurizes the liquid combustible gas before delivery to the evaporating unit, which transforms the compressed liquefied gas to compressed gas phase prior to delivery to the fuel injection system of the dual fuel internal combustion engine.

According to an example embodiment, the gas tank arrangement may comprise a valve arrangement downstream the means for converting liquefied combustible gas to compressed combustible gas. The valve arrangement may, for example, be a pressure regulator controlled by the above described control unit or another control unit of the vehicle.

According to an example embodiment, the gas tank arrangement may comprise a return conduit positioned downstream the means for converting liquefied combustible gas to compressed combustible gas and arranged in upstream fluid communication with the gas tank.

An advantage of the return conduit is that pressurized combustible gas can be redirected to the gas tank when, for example, the dual fuel internal combustion engine has been shut off. Hereby, there is a reduced risk of accidental gas delivery to the fuel system, such as the diesel system, of the vehicle.

According to an example embodiment, the return conduit may be positioned in fluid communication between the valve arrangement and the gas tank.

Hereby, the valve arrangement can be controlled to either deliver combustible gas to the fuel injection system of the dual fuel internal combustion engine or back to the gas tank.

Accordingly, and according to an example embodiment, the valve arrangement may be configured to controllably provide compressed combustible gas to the fuel injection system of the duel fuel internal combustion engine and to the gas tank.

According to an example embodiment, the gas tank arrangement may comprise a compressed combustible gas tank downstream the means for converting liquefied combustible gas to compressed combustible gas.

Hereby, a storage tank for high-pressure combustible gas is provided which can deliver high-pressure combustible gas to the fuel injection system of the dual fuel internal combustion engine when desired.

According to an example embodiment, the gas tank may be a gas pressure vessel. According to an example embodiment the additional gas tank may be an additional gas pressure vessel. It should be readily understood that also the compressed combustible gas tank may be gas pressure vessels. Pressure vessels are advantageous since they can store and contain high-pressure gas.

According to an example embodiment, the combustible gas may be natural gas. Natural gas is a well known combustible gas which, at present, can be provided at a plurality of gas stations.

According to a second aspect of the present invention, there is provided a vehicle comprising a dual fuel internal combustion engine, a feel tank and a gas tank arrangement according to any of the above described example embodiments of the first aspect of the present invention, wherein the dual fuel internal combustion engine is arranged downstream the fuel tank and the gas tank arrangement.

Effects and features of this second aspect are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of an exemplary embodiment of the present invention, wherein.

DETAILED DESCRIPTION

The present invention will now be described more fully hereinafter with reference to the accompanying drawings, in which an exemplary embodiment of the invention is shown. The invention may, however, be embodied in many different forms and should not be construed as limited to the embodiment set forth herein; rather, this embodiment is provided for thoroughness and completeness. Like reference diameter refer to like elements throughout the description.

Figure 1:
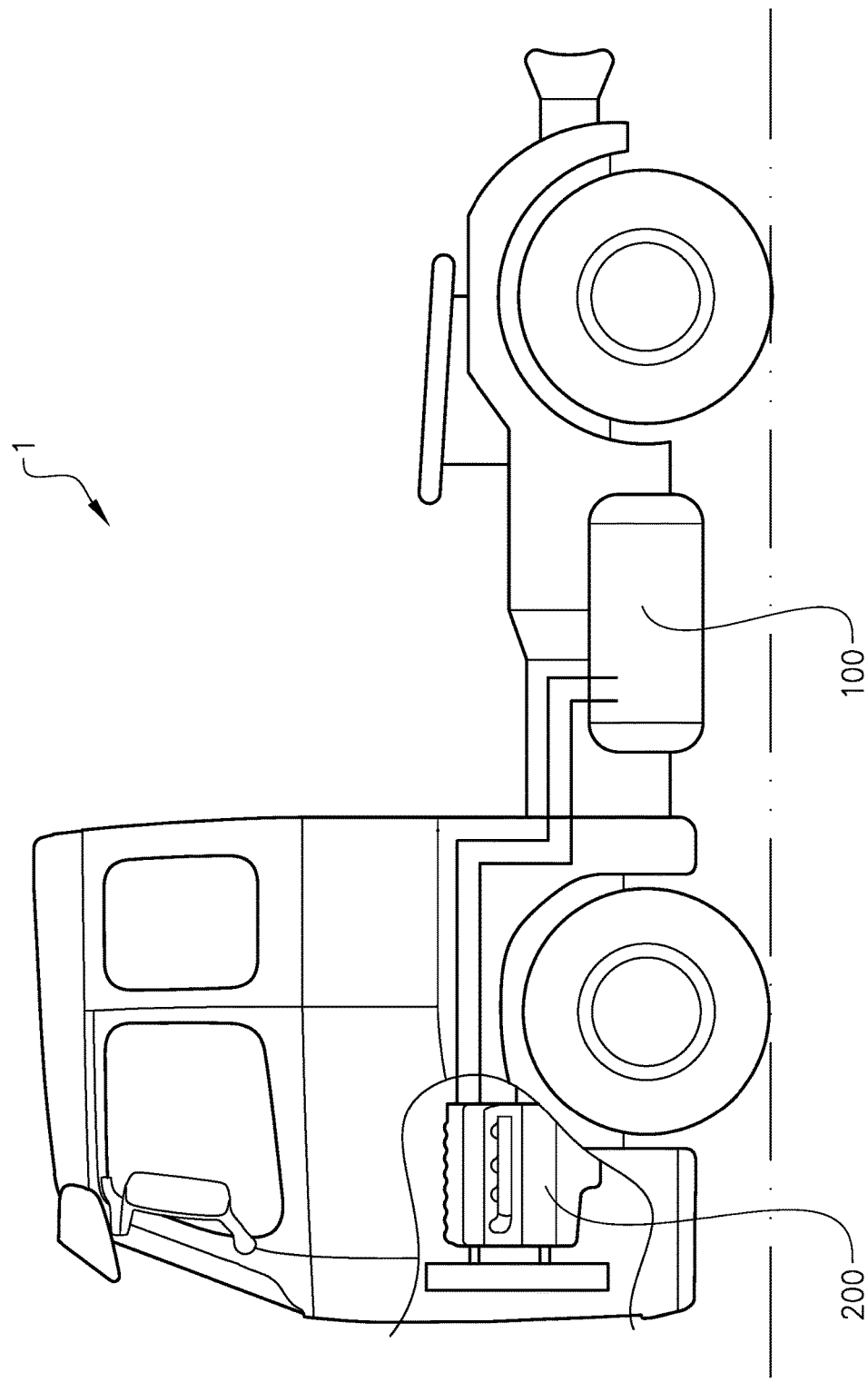
FIG. 1 is a lateral side view illustrating an example embodiment of a vehicle in the form of a truck.

With particular reference to FIG. 1, there is provided a vehicle 1 comprising a dual fuel internal combustion engine 200. The dual fuel internal combustion engine 200 is connected to a feel, tank, such as e.g. a diesel tank, and to a gas tank arrangement 100, which gas tank arrangement 100 will be described in further detail below in relation to the description of FIG. 2. The dual fuel internal combustion engine 200 is hence propelled by both conventional fuels such as e.g. diesel or petrol, as well as by a combustible gas such as e.g. compressed natural gas, DME, biogas, etc. For simplicity of understanding, the combustible gas will in the following be referred to as a natural gas, either in a liquid phase i.e. a liquid/liquefied natural gas, or in a gas phase. The natural gas can be a compressed natural gas. The vehicle 1 depicted in FIG. 1 is a heavy duty vehicle, here in the form of a truck, for which the inventive gas tank arrangement 100 is particularly suitable for.

Figure 2:
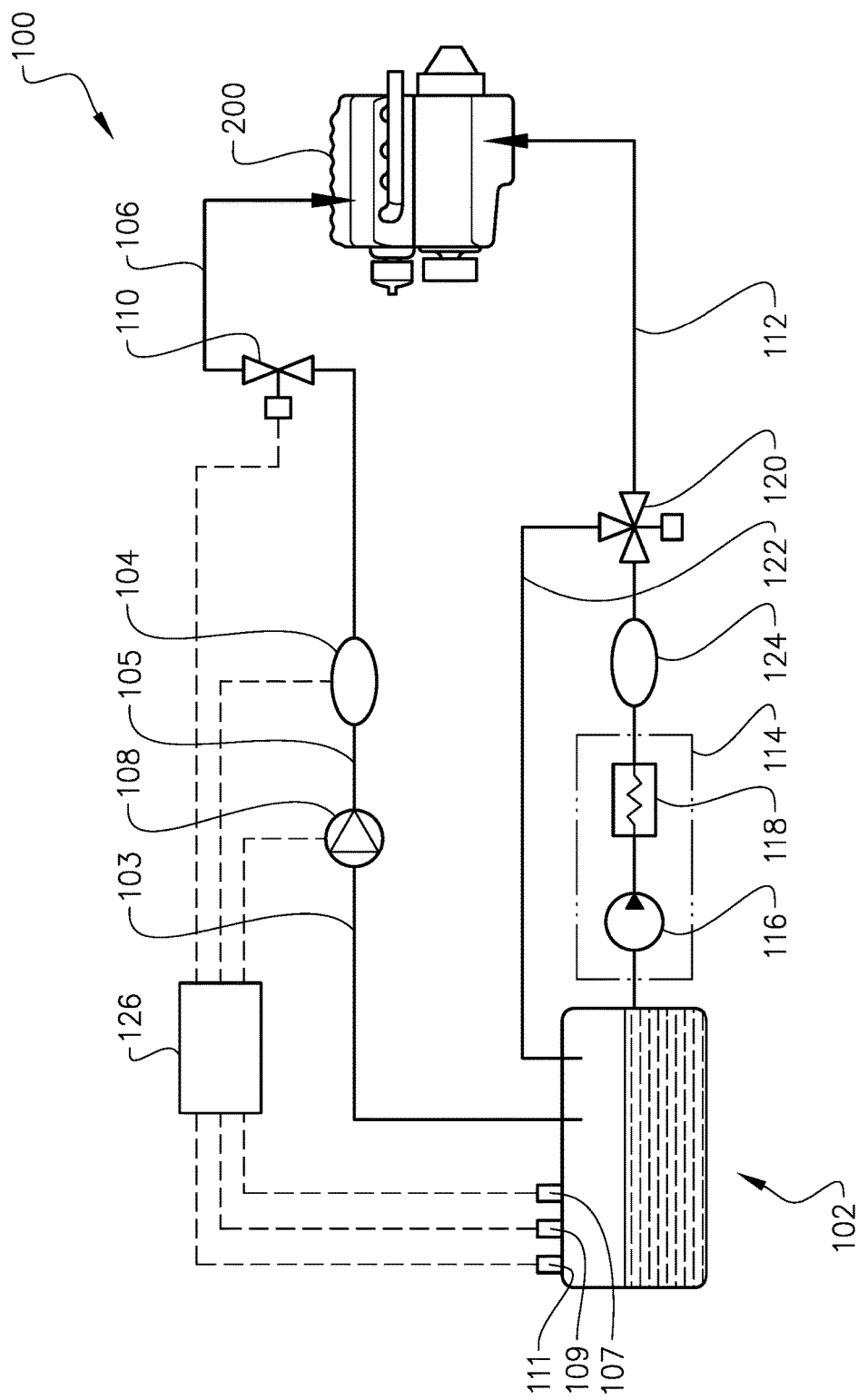
FIG. 2 is a schematic view illustrating an example embodiment of the gas tank arrangement according to the present invention.

Now, with reference to FIG. 2 an example embodiment of the gas tank arrangement 100 according to the present invention is depicted. The gas tank arrangement 100 comprises a gas tank 102 for storing the natural gas. The natural gas is in a liquid phase in the lower portions of the gas tank and in gas phase at the upper portion of the gas tank 102. Further, the gas tank 102 is preferably a gas tank pressure vessel arranged to store a slightly compressed natural gas. As a non-limiting example, the gas tank may be pressurized between 0-16 bar.

The gas tank 102 farther comprises different sensors for monitoring the status of the gas tank 102. The sensors are, in the embodiment depicted in FIG. 2, a gas tank temperature sensor 107 for monitoring the temperature of the gas tank 102, a gas tank gas level sensor 109 for monitoring the level of liquefied natural gas in the gas tank 102, and a gas tank pressure sensor 111 for monitoring the pressure level of the gas tank 102.

Furthermore, a compressor 108 is arranged downstream the gas tank 102. In particular, the compressor 108 is connected to the upper portion of the gas tank 102 by means of a conduit 103. The compressor 108 is thus arranged to receive natural gas in gas phase from the gas tank 102. The wording compressor should be understood to mean a device that is able to increase the pressure of the natural gas. Hence, the compressor 108 may equally as well be a pump or any other gas pressure increasing arrangement.

Still farther, an additional gas tank 104 is arranged, downstream, and in fluid communication with, the compressor 108 via a conduit 105. The additional gas tank 104, which may be seen as a buffer tank, can thus receive compressed natural gas from the compressor 108. The additional gas tank 104 may be an additional gas pressure vessel. As a non-limiting example, the pressure level of the additional gas tank 104 may be between e.g. 30-200 bars. Still farther, a control valve 110 is arranged downstream the additional gas tank 104 in fluid communication between the additional gas tank 104 and an air inlet 106 of the dual fuel internal combustion engine 200. By means of the control valve 110, compressed natural gas can thus be delivered from the additional gas tank 104 to the inlet manifold of the internal combustion engine 200 such that a mixture of air and compressed natural gas is provided to the inlet manifold.

Moreover, means 114 for converting liquefied natural gas, i.e. natural gas in liquid phase, to compressed natural gas is arranged downstream the gas tank 102. More particularly, the means 114 for converting liquefied natural gas to compressed natural gas is connected to the lower portion of the gas tank 102 for receiving liquefied natural gas therefrom, it should be understood that the means 114 for converting liquefied natural gas to compressed natural gas may be any suitable converter arrangement for converting liquefied natural gas to compressed natural gas. In the example embodiment depicted in FIG. 2, the means 114 for converting liquefied natural gas to compressed natural gas comprises a fuel, pump 116 and an evaporating unit 118. The feel pump 116 thus pressurizes the liquefied natural gas received from the gas tank 102 and the evaporating unit 118 thereafter converts the liquefied natural gas to compressed natural gas in gas phase. It should also be noted that the fuel pump 116 may be any suitable device able to increase the pressure of the liquefied natural gas and deliver it to the evaporating unit 118.

Furthermore, a combustible gas tank 124 is arranged downstream the means 114 for converting liquefied natural gas to compressed natural gas. More particularly, the combustible gas tank 124 is positioned downstream the evaporating unit 118 and thus configured to receive and store/contain compressed natural gas from the evaporating unit 118. The combustible gas tank 124 may be a combustible gas pressure vessel. As a non-limiting example, the combustible gas tank 124 may be pressurized to approximately 300 bars.

Still further, a valve arrangement 120 is positioned downstream the combustible gas tank 124. In the illustrated embodiment depicted in FIG. 2, the valve arrangement 120 is a three-way valve also connected to a return conduit 122 and to a fuel injection system (not shown) of the dual fuel internal combustion engine 200. Other valve types are of course conceivable. For example, the valve arrangement 120 may be a four-way valve which is also able to drain compressed natural gas to a drain tank or the like.

The valve arrangement 120 is thus configured to controllably deliver compressed natural gas to the fuel injection system of the dual fuel internal combustion engine 200. However, during situations where e.g. the dual fuel internal combustion engine is shut off and there is compressed natural gas present in a conduit between the combustible gas tank 124 and the valve arrangement 120, the valve arrangement 120 is configured to controllably provide compressed natural gas back to the gas tank 102 via the return conduit 122. The return conduit 122 is thus positioned in fluid communication between the valve arrangement 120 and the gas tank 102.

During normal operating conditions, the dual fuel internal combustion engine 200 is operated and fueled by compressed natural gas from the gas tank 102 and into the fuel injection system of the dual fuel internal combustion engine 200 via a gas conduit 112 comprising the fuel pump 116, the evaporating unit 118 and the combustible gas tank 124. As a non-limiting example, the dual fuel internal combustion engine 200 may be operated by up to 95% from compressed natural gas and approximately 5% from a combustible fuel such as diesel.

The gas tank arrangement 100 depicted in FIG. 2 also comprises a control unit 126. The control unit 126 is, as depicted in FIG. 2, connected to the gas tank temperature sensor 107, the gas tank gas level sensor 109, the gas tank pressure sensor 111, the compressor 108, the additional gas tank 104 and the control valve 110. The control unit 126 may also, which is not illustrated in FIG. 2, be connected to the valve arrangement 120.

The following will now in more detail describe how the gas tank arrangement 100 depicted in FIG. 2 functions. As described above, during normal operating conditions, liquefied natural gas is delivered from the gas tank 102 to the fuel pump 116 and the evaporating unit 118 for conversion into compressed natural gas, which thereafter is supplied to the fuel injection system of the dual fuel internal combustion engine 200 for propulsion thereof. However, there are situations where it is necessary to vent the gas tank 102 such that e.g. the pressure level therein is reduced. This is typically prior to refill of the gas tank 102, when the temperature of the gas tank 102 is too high, or when the level of liquefied natural gas is too high, etc.

As described above, the control unit 126 is connected to the gas tank temperature sensor 107, the gas tank gas level sensor 109 and the gas tank pressure sensor 111. Hereby, the control unit receives information from these sensors with regards to the current status of the gas tank 102. The control unit 126 further receives a signal from the additional gas tank 104 with regards to the status thereof such as feel level, pressure level etc. By means of the received information, the control unit 126 controls the compressor 108 and the control valve 110.

For example, if there is a desire to vent the gas tank 102, i.e. the control unit 126 receives signals from, for example, the gas tank pressure sensor 111 that the pressure level of the gas tank 102 has exceeded, or is about to exceed, a maximum allowable pressure limit, the control unit 126 controls the compressor 108 to initiate pumping of natural gas to the additional gas tank 104. Preferably, the control unit 126 has prior to pumping of natural gas received a signal from the additional gas tank 104 that sufficient space thereof is available. The control unit may also receive a signal from the gas tank temperature sensor 107 that the temperature of the gas tank is above, or close to, a maximum allowable temperature limit, or a signal from the gas tank gas level sensor 109 that the liquefied natural gas level is too high, which requires venting of the gas tank 102. Hence, the control unit 126 receives signals from both the gas tank 102 and the additional gas tank 104, which it evaluates and then controls the compressor 108 and/or the control valve 110 accordingly.

Furthermore, the control unit 126 may control the control valve 110 to deliver compressed natural gas to the air inlet of the dual fuel internal combustion engine 200 when it is suitable to do so. Delivery of compressed natural gas from the additional natural gas tank 104 to the air inlet of the dual fuel internal combustion engine 200 should be done when the dual fuel internal combustion engine 200 so allows and, of course, when the additional natural gas tank 104 comprises a sufficient amount of compressed natural gas. Conditions of the dual fuel internal combustion engine 200 when it is beneficial for delivery of natural gas to the inlet manifold can be when the operating temperature of the dual fuel internal combustion has reached a predetermined temperature limit and/or when the after treatment system has reached a predetermined operational temperature limit, etc.

Thus in summary, the control unit 126 receives a signal, or a plurality of signals, from the gas tank 102 with information of the status thereof. The control unit 126 also receives signal(s) from the additional gas tank 104. If the signal(s) from the gas tank 102 indicates a need/desire to vent the gas tank 102 and the signal(s) from the additional gas tank 104 indicates that space is available to receive compressed natural gas, the control unit 126 issues a control signal to the compressor 108 to pump and compress natural gas from the gas tank 102 to the additional gas tank 104. The control unit 126 also controls the control valve 110 to either be arranged in a closed state to prevent compressed natural gas to be delivered to the air inlet of the dual fuel internal combustion engine 200, or be positioned in an open state to allow compressed natural gas to be delivered to the air inlet of the dual fuel internal combustion engine 200 when the dual fuel internal combustion engine 200 so allows. It is thus to be understood that the control unit is, either directly or via another control unit 126 of the vehicle, also connected to the dual fuel internal combustion engine 200.

It is to be understood that the present invention is not limited to the embodiment described above and illustrated in the drawings; rather, the skilled person will recognize that many changes and modifications may be made within the scope of the appended claims. For example, the return conduit 122 must not be connected to the valve arrangement 120. Rather, the return conduit 122 could equally as well be connected to a conduit between the combustible gas tank 124 and the valve arrangement 120, or between the evaporating unit 118 and the combustible gas tank 124. Also, the various components and/or arrangements depicted in FIG. 2 must not necessarily have to be connected to one and the same control unit. It is of course possible to connect them to separate or different control units which interact with each other.

The invention claimed is:

1. A gas tank arrangement for a dual fuel internal combustion engine, the gas tank arrangement comprising
    a gas tank for containing a combustible gas,
    an additional gas tank downstream the gas tank, wherein the additional gas tank is configured to be arranged in upstream fluid communication with an air inlet of the dual fuel internal combustion engine for delivery of combustible gas to the dual fuel internal combustion engine via the air inlet, and
    a control unit, the control unit being configured to receive a signal indicative of a gas pressure level within the gas tank, receive a signal indicative of available space within the additional gas tank, and to control supply of combustible gas from the gas tank to the additional gas tank when the gas pressure level within the gas tank is above a predetermined gas pressure threshold limit and the available space within the additional gas tank is above a predetermined volume limit.

2. The gas tank arrangement according to claim 1, wherein the gas tank arrangement comprises a compressor arranged in fluid communication between the gas tank and the additional gas tank.

3. The gas tank arrangement according to claim 1, wherein the gas tank arrangement comprises a control valve positioned downstream the additional gas tank.

4. The gas tank arrangement according to claim 1, wherein the gas tank arrangement comprises a gas conduit in fluid communication with the gas tank and configured to be arranged in fluid communication with a fuel injection system of the dual fuel internal combustion engine for supply of combustible gas from the gas tank.

5. The gas tank arrangement according to claim 4, wherein the gas conduit comprises means for convening liquefied combustible gas to compressed combustible gas.

6. The gas tank arrangement according to claim 5, wherein the means for converting liquefied combustible gas to compressed combustible gas comprises a fuel pump and an evaporating unit in downstream fluid communication with the fuel pump.

7. The gas tank arrangement according to claim 5, wherein the gas tank arrangement comprises a valve arrangement downstream the means for converting liquefied combustible gas to compressed combustible gas.

8. The gas tank arrangement according to claim 6, wherein the gas tank arrangement comprises a return conduit positioned downstream the means for converting liquefied combustible gas to compressed combustible gas and arranged in upstream fluid communication with the gas tank.

9. The gas tank arrangement according to claim 8, wherein the return conduit is positioned in fluid communication between the valve arrangement and the gas tank.

10. The gas tank arrangement according to claim 7, wherein the valve arrangement is configured to controllably provide compressed combustible gas to the fuel injection system of the dual fuel internal combustion engine and to the gas tank.

11. The gas tank arrangement according to claim 5, wherein the gas tank arrangement comprises a compressed combustible gas tank downstream the means for converting liquefied combustible gas to compressed combustible gas.

12. The gas tank arrangement according to claim 1, wherein the gas tank is a gas pressure vessel.

13. The gas tank arrangement according to claim 1, wherein the additional gas tank is an additional gas pressure vessel.

14. The gas tank arrangement according to claim 1, wherein the combustible gas is natural gas.

15. A vehicle comprising a dual fuel internal combustion engine, a fuel tank and a gas tank arrangement according to claim 1, wherein the dual fuel internal combustion engine is arranged downstream the fuel tank and the gas tank arrangement.

* * * * *